United States Patent
Mestach et al.

(10) Patent No.: US 8,013,050 B2
(45) Date of Patent: Sep. 6, 2011

(54) WATERBORNE MULTISTAGE POLYMER DISPERSION

(75) Inventors: Dirk Emiel Paula Mestach, Nijlen (BE); Robert Van Egmond, Bergen Op Zoom (NL)

(73) Assignee: Nuplex Resins B.V., Bergen op Zoom (NL)

( * ) Notice: Subject to any disclaimer, the term of this patent is extended or adjusted under 35 U.S.C. 154(b) by 624 days.

(21) Appl. No.: 11/628,997

(22) PCT Filed: Jun. 10, 2005

(86) PCT No.: PCT/EP2005/052686
§ 371 (c)(1),
(2), (4) Date: Sep. 19, 2008

(87) PCT Pub. No.: WO2005/121595
PCT Pub. Date: Dec. 22, 2005

(65) Prior Publication Data
US 2009/0143528 A1    Jun. 4, 2009

Related U.S. Application Data

(60) Provisional application No. 60/586,725, filed on Jul. 12, 2004.

(30) Foreign Application Priority Data

Jun. 11, 2004 (EP) .................... 04076716

(51) Int. Cl.
*C08L 101/06* (2006.01)
*C08F 220/06* (2006.01)
*C08F 265/02* (2006.01)

(52) U.S. Cl. .......... 524/460; 526/201; 526/203

(58) Field of Classification Search ........... 524/460; 526/201, 203
See application file for complete search history.

(56) References Cited

U.S. PATENT DOCUMENTS

| 4,107,013 | A | 8/1978 | McGinniss et al. |
| 4,244,850 | A | 1/1981 | Mylonakis |
| 5,306,744 | A | 4/1994 | Wolfersberger et al. |
| 2004/0034147 | A1* | 2/2004 | Zama ................ 524/460 |

FOREIGN PATENT DOCUMENTS

| EP | 330246 A2 | 8/1989 |
| EP | 0341886 A | 11/1989 |
| EP | 442653 A2 | 8/1991 |
| EP | 602763 A1 | 6/1994 |
| EP | 0989163 A | 3/2000 |
| JP | 58079006 A * | 5/1983 |
| JP | 01201312 A * | 8/1989 |

OTHER PUBLICATIONS

Loutz et al. (Organic Coating, No. 8, p. 197-209 (1986).

* cited by examiner

*Primary Examiner* — Kelechi C Egwim
(74) *Attorney, Agent, or Firm* — Coraline J. Haitjema; David Owen; Hoyng Monegier LLP

(57) ABSTRACT

The invention relates to a process for the manufacture of a waterborne multistage polymer dispersion that has ethylenically unsaturated functional groups for crosslinking. The process comprises the steps of;
a. making an aqueous emulsion or solution of a first stage polymer comprising carboxylic acid functionalized monomers to an amount sufficient to make the first stage polymer water soluble or dispersible,
b. at least partially neutralizing the first stage polymer with a base,
c. forming a two-stage polymer dispersion by adding to the at least partially neutralized first stage polymer a second stage monomer mixture and emulsion polymerizing said second stage monomer mixture to a second stage polymer which is less hydrophilic than the first stage polymer,
d. reacting with the obtained two-stage polymer dispersion a bi-functional compound comprising an ethylenically unsaturated group and a group reactive towards the carboxylic acid in the two-stage polymer.

The invention further relates to a water-borne curable multistage polymer dispersion, to coating compositions.

41 Claims, No Drawings

WATERBORNE MULTISTAGE POLYMER DISPERSION

This application is a §371 U.S. national phase application of International Application Number PCT/EP2005/052686, filed Jun. 10, 2005, and claims priority to European Application No. 04076716.2, filed Jun. 11, 2004, and U.S. Provisional Application No. 60/586,725, filed Jul. 12, 2004, the entire contents of which are incorporated by reference herein.

FIELD OF THE INVENTION

The invention relates to a process for the manufacture of a waterborne multistage polymer dispersion that has ethylenically unsaturated functional groups for crosslinking. The crosslinking can occur by a free radical process under the influence of visible or ultra-violet light, under electron-beam radiation, with a thermal initiator or by means of auto-oxidation. The invention further relates to a water-borne curable multistage polymer dispersion, to coating compositions comprising said polymer dispersion, to a process for coating articles and to coated articles coated with said coating composition.

BACKGROUND OF THE INVENTION

Due to increasingly stringent laws concerning the allowable contents of volatile organic compounds in coatings, major efforts have been made to minimize the use of organic co-solvents in water borne coatings based on acrylic binders. However, in water borne coatings that use acrylic polymers as the main binder, the final hardness after curing of an applied coating film is limited by the amount of organic co-solvents in the coating formulation. For some coating applications a minimum hardness is required, for example if a high blocking-resistance or scratch-resistance is important. The hardness of the final coating can be increased by introducing a cross-linking mechanism in the coating. Coating compositions that crosslink under the influence of actinic radiation have been known for quite some time. In industrial practice the actinic radiation used is mainly ultra-violet (UV) or electron-beam (EB) radiation. In order to reduce the viscosity sufficiently to allow the coatings to be applied on a surface, the known compositions always contain low molecular weight diluents. These diluents are known to be irritating or toxic, so a clear need exists to develop waterborne binders that can be cured by UV or EB radiation and do not require diluent but nevertheless have sufficiently low viscosity to be applied.

Multifunctional ethylenically unsaturated molecules may be blended with aqueous polymer dispersions prior to application to give an UV-curable composition to increase crosslink density of the coating. Problems are encountered with these two component UV-curable compositions: First, the multifunctional molecules, such as for example monomers and oligomers, may present safety, health and environmental problems. Second, problems are encountered with mixing the multifunctional molecules with the polymer dispersions, including incompatibility of the two components and the burden and inefficiency of additional steps. The multifunctional molecule may have to be pre-emulsified before it can be added to the polymer dispersion. Improper pre-emulsification leads to defects in the final UV-cured coating.

U.S. Pat. No. 4,107,013 discloses a UV-curable aqueous dispersion paint containing a polymer dispersion and 5-35% of an emulsified low molecular weight crosslinking agent wherein the polymer dispersion has a shell of copolymerized difunctional monomers containing unreacted allyl groups.

U.S. Pat. No. 4,244,850 discloses air-curing a waterborne coating composition containing unsaturated resin particles, drier salt emulsion and water-immiscible organic solvent. The unsaturated resin is formed from 1-20% by weight of a monoethylenically unsaturated monomer having a carboxyl or 1,2-epoxy functionality, a portion of which has been reacted with 1,2-epoxy or carboxyl functionality, respectively, to provide unsaturation sites on the resin particles. The resin is not neutralized before functionalization.

European Patent Application EP 330,246 discloses a curable aqueous dispersion formed by first polymerizing an organic phosphate or phosphonate compound or mixtures thereof with a (meth)acrylate derivative or an other unsaturated compound or a styrene derivative and then adding an ethylenically unsaturated, epoxy-containing monomer.

U.S. Pat. No. 4,925,893 discloses auto-oxidative and radiation curable vinylidene chloride/vinyl chloride/2-ethylhexyl acrylate dispersions having residual unsaturation via the addition of a gel fraction of at least 5 weight % formed from a multifunctional monomer early in the polymerization and the addition of a low reactivity multifunctional compound, such as diallyl phthalate, late in the polymerization.

European Patent Application EP 442,653 discloses the preparation of polymers containing functionality. Amine functional latex is formed by reacting a carboxyl functional polymer dispersion with aziridines. The amine functional latex is then reacted with a material having both an enolic carbonyl group and another functional group, for example 2-(acetoacetoxy)ethyl methacrylate to give a methacrylate functional polymer.

Loutz et al. [Organic Coatings, Number 8, pages 197-209 (1986)] discloses the preparation of polymer dispersions according to a core-shell polymerization. The difunctional monomer is contained in the shell pre-emulsion.

European patent application EP0602763 describes a multistaged polymer dispersion formed from a first stage polymer and a second stage polymer having □, β-unsaturated carbonyl functionalisation which permits curing by UV radiation. The weight ratio of said first stage polymer to said second stage polymer is from about 20:80 to about 70:30. Hydrofobic monomers are preferred for the first stage polymer. The second stage polymer comprises between about 30 and 60 wt % of at least one co-monomer containing acid functionality. The acid functionality is partially neutralized with a base and is reacted with a mono-ethylenically unsaturated epoxide. Preferably, the first stage polymer contains about 10% by weight, preferably from about 1% to about 5% by weight of a crosslinking comonomer (allyl methacrylate). The problem associated with this synthesis route is the fact that the dispersion is not very stable, leading to coarse particles and a broad particle size distribution. The resulting polymer dispersion is difficult to filter and films cast from it have a dull and gritty appearance. Because of the occurrence of instability the maximum achievable solids content of the final dispersion is lower than desired, typically below about 30 wt. %. Without being limited to the explanation it is believed that in the prior art process during the synthesis of the carboxyl functional second stage polymer, a significant amount of water-phase polymerisation will occur. The water-phase polymerization will lead to the formation of water soluble, non-adsorbing, high molecular weight polymers that can lead to the occurrence of dispersion instability leading to flocculation. Further, it was found that the carboxyl functional second stage polymer will swell upon the addition of a neutralizing base. This will cause a strong increase in the viscosity of the dispersion. Upon reaction of the carboxyl groups with the monoethylenically unsaturated epoxide, the acid value of the second stage polymer will decrease again. This has been found to lead to further destabilization of the polymer dispersion.

The object of the invention therefore is to provide a process for the manufacture of a polymer dispersion that has a good stability even at high solid contents and has fine particles in a relatively narrow particle size distribution.

SUMMARY OF THE INVENTION

According to the invention there is provided a process for the manufacture of a waterborne curable multistage polymer dispersion comprising the steps of;
  a. making an aqueous emulsion or solution of a first stage polymer comprising carboxylic acid functionalised monomers to an amount sufficient to make the first stage polymer water soluble or dispersible,
  b. at least partially neutralising the first stage polymer with a base,
  c. forming a two-stage polymer dispersion by adding to the at least partially neutralised first stage polymer a second stage monomer mixture and emulsion polymerising said second stage monomer mixture to a second stage polymer which is less hydrophilic than the first stage polymer,
  d. reacting with the obtained two-stage polymer dispersion a bi-functional compound comprising an ethylenically unsaturated group and a group reactive towards the carboxylic acid in the two-stage polymer.

It was found that the process according to the invention results in a mono-modal, fine particle size polymer dispersion that gives smooth and glossy films. It was further found that in the method according to the invention, due to the fact that the second stage polymer is synthesised in the close presence of the partially neutralised first stage polymer, substantial grafting occurs. This leads to a polymer dispersion with a particle morphology that is better defined and where the presence of water-soluble non-adsorbing polymer is minimized. It was found that at least about 50% of the largely water-soluble first stage polymer is permanently attached to the substantially water-insoluble second stage polymer. When techniques such as catalytic chain transfer or (reversible) addition fragmentation polymerization are used to control the molecular weight of the first stage polymer, the degree of attachment can even significantly higher. The water-soluble polymer can be permanently attached by entanglement or by chemical grafting through proton abstraction. This is expressed in the degree of attachment, defined as the percentage (relative to the total of first stage polymer) of first stage polymer that cannot be separated from the two stage polymer dispersion in a defined separation test. In this test the dispersion is diluted with demineralized water to a solids content of 15%. After equilibration for 16 hours the supernatant is obtained by ultracentrifugation at 40,000 rpm (corresponding with a force of 1.8.105 g) for one hour. The solids content of the supernatant is analyzed by drying at 110 degree C. for two hours. From the first stage polymer content in the supernatant the degree of attachment can be calculated.

The solids content of the polymer dispersion can be higher than 35 or even 40 wt. %, while still having a viscosity that allows for easy handling of the product. The particle size distribution is narrower and the particle size can be below 400 nanometers at solid contents above 35 or even 40 wt. %. When applied to a substrate and cured, for example with UV light, a coating is obtained with good esthetical properties and excellent chemical resistance properties. As an alternative for ultra violet or electron beam curing, the polymer can be crosslinked through auto-oxidation under the influence of oxygen from the atmosphere and a suitable metal drier-salt.

It was further also found that the Konig hardness increase on curing of a coating based on the polymer dispersion according to the invention is significantly better than in the prior art. The advantage of having a high hardness increase on curing is that it is possible to start with a relatively soft polymer and nevertheless end up with a high hardness after curing. The advantage of a relatively soft polymer before curing is that the film-forming temperature is relatively low, that the coating has better film forming properties and/or that less or no solvents are needed to achieve good film forming properties.

DETAILED DISCRIPTION OF THE INVENTION

The First Stage Polymer

The first stage polymer is composed of a first stage ethylenically unsaturated monomer mixture, preferably comprising esters of acrylic and methacrylic acid such as n-butyl (meth) acrylate, methyl (meth) acrylate, ethyl (meth) acrylate, 2-ethylhexyl (meth) acrylate, cycloalkyl (meth) acrylates, e.g., isobornyl (meth) acrylate and cyclohexyl (meth) acrylate, or an ethylenically unsaturated compound such as styrene, e.g., normal styrene or substituted styrenes, for instance α-methyl with the styrene or t-butyl styrene; vinyl toluene; dienes such as 1,3-butadiene or isoprene, or mixtures thereof. Also vinyl esters, such as vinyl acetate, vinyl alkanoate or their derivatives or mixtures thereof can be used in the monomer composition. Nitriles, such as (meth) acrylonitrile, or olefinically unsaturated halides, such as vinyl chloride, vinylidene chloride, and vinyl fluoride can also be used. The monomer composition also contains unsaturated monomers with carboxylic functionality. Optionally, the acid groups are latent as, for example, in maleic anhydride, where the acid functionality is present in the form of an anhydride group. Preferably, monomers such as (meth)acrylic acid are used. Other possible carboxylic acid-functional monomers are itaconic acid, fumaric acid maleic acid, citraconic acid, or the anhydrides thereof.

The choice of the amount of carboxylic acid functionalised monomers in the first stage polymer is chosen in view of the desired hydrophilicity for obtaining water solubility or dispersibility and in view of providing reactive groups for later reaction with the bifunctional compound. It is preferred that the weight percentage of (latent) carboxylic acid group monomers in the first stage polymer is 10 to 70 wt %, preferably from 20 wt % to 60 wt %. Acrylic or methacrylic acid are preferred carboxylic acid functional monomers.

Besides monomers having carboxylic acid functionality also monomers possessing a further acid-functional group other than the carboxylic one can be present in the monomer composition to improve hydrophilicity. Examples of such monomers are ethylmethacrylate-2-sulfonic acid, 2-acrylamido-2-methylpropane sulfonic acid, phosphate esters of hydroxy-functional monomers commercially available under the tradenames ADD APT® PolySurf (ex ADD APT Chemicals AG), Sipomer® PAM (ex Rhodia), vinylphosphonic acid, styrene phosphonic acid. Other monomers possessing a further functional group other than the acidic one can also be present in the monomer composition. Examples of such monomers are hydroxy-functional monomers such as hydroxyethyl (meth)acrylate, hydroxypropyl-(meth)acrylate, hydroxybutyl-(meth)acrylate, (meth)acrylamide or derivatives of (meth)-acrylamide such as N-methylol (meth) acrylamide and diacetone acrylamide. Also the adducts of hydroxy-functional monomers with ethylene or propylene can be used. Furthermore, also monomers containing an activated methylene group such as acetoacetoxy-ethyl-(meth)acrylate or 2-methyl-acrylic acid 2-methyl-2-(3-oxo-butyrylamino)-propyl ester. Further hydrophilicity can be introduced into the first stage polymer by using monomers containing a non-ionic, water-soluble side chain, such as polyethylene glycol (meth)acrylate, methoxypolyethylene glycol (meth)acrylate. In case the first stage polymer comprises further hydrophilicity increasing groups such as acid-functional groups or hydrophilic chain parts, the amount of carboxylic acid functionalised monomers can be chosen relatively low.

The number average molecular weight of the first polymer preferably is between 500 and 100,000, more preferably between 1000 and 50,000 gr/mole. In the polymerisation of the first stage polymer preferably chain transfer agents, such as mercaptans, are used to control the number average molecular weight of the polymer. Suitable mercaptanes include n-dodecyl mercaptane, t-dodecyl mercaptane, octyl mercaptane, mercaptoethanol, mercapto propionic acid and esters of mercapto propionic acid. Mercaptans have the advantage that they are relatively inexpensive. Other chain transfer agents that can be used include but are not limited to non-mercaptan compounds such as carbon tertrachloride, carbon tetrabromide, benzylalcohol and alpha methyl styrene dimer. Other means of controlling the molecular weight can also be used such as catalytic chain transfer, (reversible) addition fragmentation, nitroxide mediated radical polymerization and degenerative iodine transfer. In view of obtaining a higher degree of attachment of the first stage polymer to the second stage polymer preferably an addition fragmentation chain transfer agent is used.

The preparation of the first stage polymer can be carried out by means of various techniques, such as solution polymerization, bulk polymerization or emulsion polymerization. Preferably the emulsion polymerization technique is used. When the first stage polymer is made by means of emulsion polymerization conventional emulsion polymerization procedures can be used. A general description of the emulsion polymerization process is given in E. W. Duck, Encyclopedia of Polymer Science and Technology (John Wiley & Sons, Inc.: 1966), Vol. 5, pp. 801-859.

Emulsifying agents that can be used for the emulsion polymerization of the first stage polymer are, for example, anionic and/or non-ionic emulsifiers. Anionic emulsifiers include, but are not limited to, alkylethoxylate sulfate and sulfonate, alkylphenolethoxylate sulfate and sulfonate, alkylsulfate and sulfonate, alkylethoxylate phosphates, alkylphenol ethoxylate phosphates, alkyl phosphates, alkylaryl sulfonates, sulfosuccianates, and mixtures thereof. Non-ionic surfactants include, but are not limited to, alkylaryl polyether alcohols, alkylphenol ethoxylates, alkyl ethoxylates, ethylene oxide block copolymers, propylene oxide block copolymers, polyethylene oxide sorbitan fatty acid esters, and mixtures thereof. Preferably, the amount of emulsifying agent used is between 0.3 to 2% by weight, based on the weight of total amount of monomer. More preferred is an amount of emulsifying agent of 0.3 to 1% by weight. Besides the conventional types of surfactants also surface active molecules having an ethylenically unsaturated bond that can participate in a free radical polymerization, so-called reactive surfactants, can be used either as sole-emulsifier or in combination with conventional surfactants. Commercially available reactive surfactants are for example Maxemul 5010 (ex Uniqema), Trem LF-40 (ex Henkel) or Hitenol BC (ex Dai-Ichi Kogyo Seiyaku Co., Ltd).

Other reactive surfactants include hemi-esters of maleic anhydride with fatty alcohols such as n-dodecylmaleate.

If the first polymer is prepared by emulsion polymerization, the polymerization can be initiated with free-radical forming initiators such as alkali persulfate and ammonium persulfate, azo-initiators such as azo-bis-isobutyronitrile or 4,4'-azo-bis-cyanvaleric acid, organic (hydro)peroxides or peresters, such as tertiary butyl hydroperoxide or tertiary butyl perpivalate. The radicals can be formed, for instance, by heating the reaction mixture or by the use of a reducing compound, optionally combined with a metal salt. Reducing compounds are for example sodium pyrosulfite, sodium formaldehyde sulfoxylate, ascorbic acid, and the like. Often traces of metal salts are used to catalyze the decomposition of the initiator. The reaction temperature generally is between 20 and 95° C.

As first stage polymer also commercially available carboxylic acid functional polymers can be used as long as they obey the composition requirements described above. The commercial first stage polymers can be in the form of solids or in the form of the aqueous solutions of their salts. Examples of such polymers are commercialized under the trade names Morez (ex Rohm and Haas), Joncryl (ex Johnson Polymer). Examples of such polymers are Joncryl 678, Morez 101 and Morez 400 PLUS. Also commercially available solid polymers having a latent carboxylic can be used as the first stage polymer. An example of such a polymer is sold under the trade name SMA® (ex Atofina). The SMA® resins are copolymers of styrene and maleic anhydride where the styrene/maleic anhydride ratio is from 1:1 to 4:1. After neutralization and dilution with water the anhydride group is converted to the salt of a carboxylic acid.

Neutralising the First Stage Polymer (Step b):

The first stage polymer is at least partially neutralised by adding a base to neutralise the acid groups in the first stage polymer. Preferably, the first stage polymer is neutralised only to the extent that is required for solubilization or emulsification thereof. Preferably, the degree of neutralization is lower than 1 because the un-neutralised free carboxylic acid groups react more readily with the bifunctional compound, in particular the preferred epoxide-functional monomer. The degree of neutralization is defined as the ratio of carboxylic salt groups to the initial concentration of carboxylic acid groups. In view of the reactivity towards the bifunctional compound, the degree of neutralisation is preferably below 0.8, more preferably below 0.6, and even more preferably below 0.4. In view of the desired solubilization or emulsification, the degree of neutralisation is preferably at least 0.2.

For the neutralization of the first stage polymer, a base is used, preferably a volatile base is used, most preferably ammonia. Other possible bases are, for example, volatile amines, such as amino methyl propanol, dimethyl ethanolamine or 2-dimethylamino-2-methyl-1-propanol, triethyl amine or monoethanol amine. Optionally, a blend of different volatile bases can be used. The advantage of using a volatile base is that after drying and curing of the film the salt-groups are converted back into the free carboxylic acid groups, imparting better water resistance to the coating.

The Second Stage Polymer (Step c)

The second stage polymer is prepared by emulsion copolymerizing a mixture of ethylenically unsaturated monomers monomers in the presence of the at least partially neutralized first stage polymer. The second stage polymer is characterised by the fact that it is significantly less hydrophilic (or more hydrophobic) than the first stage polymer. The hydrofilicity can be quantified in terms of the acid value or the concentration of acid functional monomer. When both the first and the second stage polymer contain carboxylic acid functional monomers the second stage polymer comprises significantly less carboxylic acid functional monomers that the first stage polymer. Preferably, the second stage polymer comprises at least 10%, preferably at least 20%, more preferably at least 30% less carboxylic acid functionalised monomers. This difference can also be expressed as a difference in acid number. The difference in acid number is preferably at least 50 mg KOH/g, more preferably 100 mg KOH/g and most preferably 200 mg KOH/g. When other hydrophilic monomers are present in either the first or second polymer, a significant difference in the solubility parameter, as defined by van Krevelen (Properties of Polymers, Elsevier Science Publishing Co, New York, 1990), is required. The difference in hydrophilicity is required to obtain a particle morphology where the first stage polymer remains at the periphery of the polymer particle during and after the polymerization of the second stage polymer. In a preferred embodiment, the first stage polymer comprises 10 to 70 wt. % of carboxylic acid functionalised monomers and the second stage polymer comprises less than 10 wt % of carboxylic acid functional monomers.

The monomers used in the synthesis of the second stage polymer can be selected from the same group as used in the synthesis of the first polymer. The same applies for the surfactants, chain transfer agents and initiating systems that are being used in the synthesis of the second stage polymer. The ratio between the first and second stage polymer is from 80:20 to 20:80.

It was found that in a process according to the invention as compared to the processes according to the prior art that morphology of the particles is better defined leading to a small a particle size and a small a particle size distribution even at high solid contents. Preferably, the solids content is at least 30 wt % percent, preferably at least 35 wt %, more preferably at least 40 wt. % and most preferably at least 45 wt. %. The average particle size at a solids content of at least 35 wt. % is preferably below 400, more preferably below 350 even more preferably below or 300 and most preferably below 250 nanometers. Further, a significantly higher amount of the first stage polymer is attached to the second stage polymer leading to better properties in coating applications. Preferably, this amount expressed in the degree of attachment is at least 40%, more preferably at least 50%, even more preferably at least 60% and most preferably at least 70%.

It is preferred that the monomer-mixture used in the second stage polymerization contains polyfunctional monomer to impart a certain gel content to the second stage polymer. Creating a gel content positively influences the mechanical properties of coatings derived from the polymer dispersion. With polyfunctional monomer is meant a molecule that contains at least two ethylenically unsaturated groups that can participate in a free radical polymerization. Non-limiting examples of such polyfunctional monomers are allyl methacrylate, divinyl benzene, tri allyl cyanurate, 1,2,4 tri vinyl cyclohexane methylene bis-acrylamide, methylene bis-methacrylamide, vinyl methacrylate, vinyl crotonate, vinyl acrylate, vinyl acetylene, trivinyl benzene, divinyl acetylene, divinyl ethane, divinyl sulfide, divinyl ether, divinyl sulfone, diallyl cyanamide, ethylene glycol divinyl ether, diallyl phthalate, divinyl dimethyl silane, allyl acrylate, diallyl maleate, diallyl fumarate, diallyl itaconate. Other usefull di- or poly-functional monomers are the esterification products of polyhydric alcohols with (meth)acrylic acid. Examples include alkylene glycol diacrylates and dimethacrylates, such as for example, ethylene glycol diacrylate, ethylene glycol dimethacrylate, 1,3-butylene glycol diacrylate, 1,4-butylene glycol diacrylate propylene glycol diacrylate and triethylene glycol dimethylacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate. Also (meth)acryloyl functional oligomers such as epoxyacrylates, aliphatic and aromatic urethane acrylates, polyester acrylates, melamine acrylates, silicone and acrylic acrylates can be used as di- or poly-functional monomers. Such oligomers are commercially available under the tradenames Actilane (ex. Akzo Nobel Resins), Ebecryl (ex. UCB Surface Specialties) or Laromer (ex. BASF).

After the second stage polymerization has come to completion, the pH can be adjusted by adding a base in order to improve the colloidal stability of the dispersion. Preferably the base is the same as the one used in neutralizing the first stage polymer.

Reaction with a Bi-functional Compound (Step d)

In process step d) the two-stage polymer dispersion is reacted with a bi-functional compound having an ethylenically unsaturated group and a group reactive towards the carboxylic acid in the two-stage polymer. The bi-functional compound may also have other functional reactive groups. The multi-stage polymer dispersion is preferably reacted with an ethylenically unsaturated mono-epoxide, preferably in the presence of a catalyst for the epoxy-acid reaction. Suitable ethylenically unsaturated monoepoxides include: glycidyl (meth)acrylate, allyl glycidyl ether, glycidyl cinnamates, glycidyl crotonates, glycidyl itaconates, glycidyl norbornenyl ester, glycidyl norbornenyl ether and the like. The modification is carried out in the presence of a suitable catalyst for the epoxy carboxylic acid reaction, preferably a phase-transfer catalyst. Examples of phase transfer catalysts that can be used for the modification are tetra-n-butyl ammonium hydroxide, methyltributylammonium hydroxide or benzyltriethylammonium hydroxide.

Optionally, secondary crosslinking agents that are reactive to functional groups in the first or second stage polymer other than the ethylenically unsaturated groups, can be added to the dispersion after the synthesis in order to obtain a dual cure one component system. A dual cure system can be advantageous when coating tri-dimensional substrates, where it is difficult to get a homogeneous irradiation with UV light. The second crosslinking mechanism will provide satisfactory performance of the coating also on those places that did not receive sufficient radiation. Dual cure one component systems can for example have the advantage of a decreased effective curing time. For example, coated articles cured by a quick primary radiation curing can already be handled whilst the curing by the secondary curing mechanism continues to improve the mechanical properties of the coating.

In a preferred embodiment of a dual cured one component system, the first stage and/or second stage polymer comprise carbonyl-functional monomers and the dispersion further comprises secondary crosslinkers that react with carbonyl-functional monomers resulting in a stable one-component system. Examples of such secondary crosslinkers are compounds with a hydrazide function, generally containing two or more hydrazine, hydrazide or hydrazone groups. Examples of such compounds are bishydrazides of dicarboxylic acids having 2 to 12 carbon atoms, such as the bishydrazides of oxalic acid, malonic acid, succinic acid, glutaric acid, adipic acid, pimelic acid, suberic acid, azelaic acid, sebacic acid or the isomeric phthalic acids; carbonic acid bis-hydrazide, alkylene- or cycloalkylene-bis-semicarbazides, N,N'-diaminoguanidine, alkylenebishydrazines such as N,N'-diaminopiperazine, arylenebishydrazines such as phenylene- or naphthylenebishydrazine, alkylenebissemicarbazides, and bishydrazides of dialdehydes and diketones. Such a one component system will cure at ambient or forced dry conditions.

Further, in an embodiment where the first or second stage polymers comprises hydroxy funtionally, secondary cross-linkers can be used towards hydroxyl-functionality in the polymer and give stable one-component dual-cure systems that cross-link under elevated baking temperatures of about 60-180° C. in about 5-60 minutes, for example, a water-soluble or water-dispersible alkylated amino aldehyde cross-linking agent. Examples of aminoaldehyde resins are urea-aldehyde, benzoguanamine aldehyde, or melamine-aldehyde condensation products, and the like. Typically, these cross-linking curing agents are the reaction products of melamine or urea with formaldehyde and various alcohols containing up to and including 4 carbon atoms. Particularly preferred cross-linking agents are alkylated melamine-formaldehyde resins. Particularly desired are melamine-formaldehyde condensation products, such as polymethoxymethyl melamines and, preferably, hexamethoxymethyl melamine. Other preferred binders are polymethoxybutyl melamines, preferably with a high degree of butylation. The preferred alkylated melamine formaldehyde resins are commercially available, for example from Solutia under the trademark Resimene™, from Akzo Nobel Resins under the trademark Setamine™, or from Cytec Industries under the trademark Cymel™. Another class of suitable cross-linkers are 1,3,5-triazine-2,4,6-triscarbamates or oligomers thereof. A suitable example is 2,4,6-tris(butoxy-carbonylamino)-1,3,5-triazine, which is available from CYTEC Industries. Optionally, an acid catalyst, such as para-toluene sulfonic acid, dinonylnaphthalene disulfonic acid, dinonylnaphthalene monosulfonic acid, or dodecylbenzene sulfonic acid, may be employed to increase the curing rate of the amino aldehyde curing agents with the acrylic resin.

In another embodiment of this invention a two-component system for ambient or forced curing is used. In such case the cross-linker may be a polyisocyanate cross-linking agent that is added to the polymer composition prior to the application thereof. Examples of polyisocyanates include the biurets or cyclotrimers of hexamethylene diisocyanate the biurets or cyclotrimers of hexamethylene diisocyanate (for example available from Bayer AG as Desmodur® N 100 and Desmodur® N 3390, respectively); isophorone diisocyanate (e.g. Vestanat® T 1890 from Creanova Inc.); 3,5,5'-trimethyl hexamethylene diisocyanate and isomers thereof; 4,4'-dicyclohexylmethane diisocyanate (Desmodur® W, ex Bayer AG); toluene diisocyanate; 4,4'-diphenylmethane diisocyanate; and tetramethyl xylylene diisocyanate. Further examples include reaction products of polyols (e.g., trimethylol propane) with an excess of a diisocyanate to form isocyanate functional polyurethanes.

Optionally, polyisocyanate-functional polyester-urethanes or acrylic-urethanes may also be used. The isocyanates can be modified with hydrophilic groups to ease incorporation into water. Examples of hydrophilic groups include polyethylene oxide. A commercially available example of such a cross-linker is Bayhydur® N 3100 from Bayer AG. Cure-promoting catalyst can be used in the coating compositions of this invention, as is typical in the art when isocyanate cross-linking or curing agents are employed. Preferred catalysts are organo-metallics, suitably dibutyl tin dilaurate, zinc octoate, dibutyl tin diacetate, zinc naphthenate, vanadium acetyl acetonate, and zirconium acetyl acetonate, in an effective curing amount, typically from about 0.1 to 2% by weight of binder.

The polyisocyanates may optionally be blocked. Examples of suitable blocking agents are materials that unblock at elevated temperatures, for example, lower aliphatic alcohols such as methanol, oximes such as methylethyl ketone oxime, and lactams such as epsilon-caprolactam. Contrary to the unblocked polyisocyanates, blocked isocyanates can be used to form stable one-package systems. At temperatures from 90-160° C. the linkage with the blocking agent is broken, resulting in the regeneration of free isocyanate groups that will react with the polymer composition.

Finally additional crosslinkers may be added that can react with residual carboxylic acid groups or with acid groups that were reconverted into the free form after evaporation of the volatile base. Examples of such crosslinkers are poly aziridines such as XAMA-7® from Bayer or CX-100 from Neo-Resins, carbodiimides, such as Ucarlink Crosslinker XL-29SE from the Dow Chemical Company or epoxy-silanes such as CoatOSil 1770 (ex Osi specialties) or 3-glycidoxypropyltrimethoxysilane commercially available as DOW CORNING Z-6040® SILANE.

The invention further relates to a water borne curable multistage polymer dispersion or powder derived there from obtainable by the process according to the invention. In particular the invention relates to a waterborne curable multistage polymer dispersion comprising a first stage polymer with a molecular weight between 500 to 100,000 g/mole comprising, preferably 10 to 70 wt. %, carboxylic acid functional monomers, a second stage polymer, preferably comprising less that 10 wt. % carboxylic acid functional monomers, emulsion polymerized in the presence of the first state polymer, wherein the first stage polymer is hydrophilic and the second stage polymer is less hydrophilic than the first stage polymer and wherein a mono-epoxide ethylenically unsaturated compound is reacted with at least part of the carboxylic acid functionality. The polymer dispersion according to the invention preferably has a solids content of at least 35 wt % and an average particle size of less than 400 nanometers and further preferably has a degree of attachment of the first stage polymer on the second stage polymer of at least 40%.

If so desired with regard to the end use, the aqueous polymer dispersion of the present invention may furthermore contain various additives such as dispersants, lubricants, anti-foaming agents, solvents, film formation aids, plasticizers, anti-freezing agents, waxes, preservatives, thickeners, etc.

The water borne curable multistage polymer dispersion may be used for the manufacture of a coating composition or for the preparation of a curable polymer powder. For the manufacture of a coating composition the usual additives or added to the polymer dispersion according to the invention as hereinabove described. In a process for the manufacture of a curable polymer powder the solid contents in the polymer dispersion according to the invention is separated from the aqueous polymer dispersion in the usual way.

The polymer dispersion or coating composition according to the invention may be used as a clear varnish or may contain pigments. Examples of pigments suitable for use are metal oxides, such as titanium dioxide or iron oxide, or other inorganic or organic pigments.

The polymer dispersion or formulated coating composition may optionally contain an ultraviolet photo-initiator for promoting UV curing. The photo-initiator may be added to the composition from about 0.2% by weight of total non-volatiles to about 2.0% by weight of total non-volatiles. Useful photoinitiators include the ones commercialized under the trade names Irgacure and Darocur (ex Ciba), Lucirin (ex BASF).

The formulated coating composition may be cured or crosslinked by applying radiation after most or all of the water has evaporated from the mixture. Useful radiation includes ionizing radiation, electron beam radiation, visible and ultraviolet radiation. Sources of ultraviolet radiation include sunlight, mercury lamp, carbon-arc lamp, xenon lamp and the like.

Optionally, the polymer dispersion or formulated coating composition may contain a thermal initiator if the coating will be cured by heat or a metal drier salt if the coating will be cured by auto-oxidation. Useful thermal initiators include azo compounds, organic peroxides and inorganic peroxides, such as ammonium persulfate, potassium persulfate, hydrogen peroxide and the like. Useful catalysts for auto-oxidative cure include the salts of cobalt, such as cobalt acetate, cobalt naphthenate and the like. Other salt that can be used as primary or auxiliary drier are derived from lead, manganese, zirconium, calcium, lithium, potassium and zinc. Optionally combinations of different driers are used.

The formulations according to the invention can be applied to a substrate in any manner desired, e.g., by means of rolling, spraying, brushing, sprinkling, flow coating, dipping, (electrostatic) spraying, or coating by electrophoresis. Suitable substrates include those of wood, metal, paper, hardboard and soft-board, concrete, stone, masonry, glass, ceramic material, and synthetic material. Curing can be carried out at ambient temperature or, optionally, at an elevated temperature to reduce the time needed to evaporate the water.

It was found that the Konig hardness increase on curing of a coating based on the polymer dispersion according to the invention is significantly better than in the prior art. Preferably, the Konig hardness increase is at least 20%, preferably at least 30%, more preferably at least 35% and most preferably at least 40%.

EXAMPLES

The process is illustrated by the following examples.

Example 1A

Preparation of a Carboxyl Functional Multi-stage Polymer Dispersion

| | | |
|---|---|---|
| A | Pre-charge | |
| | Sodium dodecyl sulfate | 5 |
| | Demineralized water | 687.1 |
| B | Initiator seed | |
| | Demineralized water | 25 |
| | Ammonium persulfate | 1 |
| C | First stage pre-emulsion | |
| | Sodium dodecyl sulfate | 15 |
| | Demineralized water | 291.7 |
| | n-butyl acrylate | 244.2 |
| | Styrene | 68.3 |
| | Methacrylic acid | 312.5 |
| | n-octyl mercaptane | 14 |
| | Mercapto ethanol | 7 |
| D | Initiator first stage | |
| | Demineralized water | 166.7 |
| | Ammonium persulfate | 2.67 |
| E | Neutralization first stage | |
| | Demineralized water | 127 |
| | Ammonia (25%) | 50.6 |
| F | Second stage monomer mixture | |
| | n-butyl acrylate | 356.1 |
| | Styrene | 231.4 |
| | Methacrylic acid | 6.25 |
| | Allyl methacrylate | 31.25 |
| G | Oxidant second stage I | |
| | Tertiary-butyl hydroperoxide | 2.08 |
| | Demineralized water | 25 |

-continued

| | | |
|---|---|---|
| H | Catalyst second stage I | |
| | Iron (II) sulfate heptahydrate | 0.033 |
| | EDTA, disodium, dihydrate | 0.042 |
| | Demineralized water | 25 |
| I | Reducing agent second stage I | |
| | D-Isoascorbic acid | 2.92 |
| | Demineralized water | 250 |
| J | Oxidant second stage II | |
| | Tertiary-butyl hydroperoxide | 2.08 |
| | Demineralized water | 25 |
| K | Catalyst second stage II | |
| | Iron (II) sulfate heptahydrate | 0.033 |
| | EDTA, disodium, dihydrate | 0.042 |
| | Demineralized water | 25 |

Demineralized water and emulsifying agent sodium dodecyl sulfate (portion A) are charged to a jacketed 3 l glass reactor and purged with nitrogen (5 l/h). The contents of the reactor are heated to 70° C. 47.6 g of monomer mixture C is added to the reactor and the contents are heated to 80° C. When the temperature has reached 80° C., an ammonium persulfate solution B is added and the reactor is heated to 85° C. The remainder of portion C is metered into the reactor over a period of 60 minutes. Simultaneously initiator solution D is added over a period of 70 minutes. The reactor is held at 85° C. for an additional 30 minutes. A sample was withdrawn from the reactor and the molecular weight was determined by means of gel permeation chromatography (mixed bed column, THF-acetic acid as eluent, RI detector, polystyrene standards). A value for the number average molecular weight of 7540 was found. An aqueous solution of ammonia E is than added over a period of 30 minutes. After holding the batch at 85° C. for 2 hours, the polymer dispersion is cooled to 45° C. 50% of the second stage monomer mixture F is added to the reactor and mixed in for 30 minutes.

A solution of t-butyl hydroperoxide in water G and a Fe(II)-EDTA complex solution H are added to the reactor. 10% of the reducer solution I is added to the reactor. An exothermic reaction occurs that will cause the temperature to rise to 55-60° C. The temperature of the reactor is maintained at 55-60° C. After 15 minutes 40% of the reducer solution I is added over a period of 30 minutes. The contents of the reactor are cooled to 50° C. The rest of monomer mixture F is added and mixed during 20 minutes. Solutions J and K are added to the reactor. 10% of reducer solution I is added to the reactor. An exothermic reaction will occur. The temperature of the batch is maintained at 60-65° C.

After a hold for 15 minutes the remainder of solution I is added over a period of 30 minutes. The batch is post-reacted at 65° C. during 20 minutes.

The resulting polymer dispersion had a solid content (drying for 1 hour at 125° C.) of 43.4% and a pH of 5.4. Particle size measured by a Malvern Zetasizer was 211 nm. The acid value of the polymer was determined to be 151 mg KOH/g.

Example 1B

Modification of a Carboxyl Functional Polymer Dispersion with an Ethylenically Unsaturated Monoepoxide

| | | |
|---|---|---|
| A | Polymer dispersion from example 1A | 1200 |
| B | Tetrabutyl ammoniumhydroxide 40% | 59.8 |
| | Demineralized water | 221.8 |
| C | Glycidyl methacrylaat | 132.4 |
| | 2,6-ditert.butyl-4-methylphenol | 0.26 |

1200 Grams of the polymer dispersion of example A1 are charged into a 3 liter jacketed reactor and purge with air (5 l/h). The contents of the reactor are heated to 80° C. Solution B is added to the contents of the reactor over a period of 5 to 10 minutes. Mixture C is than added in about 10 minutes. The reaction mixture is kept at 80° C. for 2 hours. The contents are cooled to 30° C. and filtered through a 60µ filter-bag.

After the modification the polymer dispersion had a solid content (drying for 1 hour at 125° C.) of 40.8% and a pH of 6.4. The viscosity at 23° C. is 0.0176 mPa·s. The particle size of the modified dispersion is 215 nm.

After the modification the acid value of the polymer has dropped to a value of 52.1 mg KOH/g. A film cast from this dispersion has a smooth and glossy appearance.

Comparative Experiment 2a

According to U.S. Pat. No. 5,306,744—Preparation of a Carboxyl Functional Multi-Stage Polymer Dispersion

| | | |
|---|---|---|
| A | Pre-charge | |
| | Demineralized water | 635.1 |
| | Sodium lauryl sulfate | 0.31 |
| B | Catalyst seed | |
| | Demineralized water | 5.3 |
| | Iron (II) sulfate heptahydrate | 0.008 |
| C | Oxidant seed | |
| | Ammonium persulfate | 0.23 |
| | Demineralized water | 11.1 |
| D | Reducing agent seed | |
| | Sodium bisulfite | 0.05 |
| | Demineralized water | 11.1 |
| E | First stage pre-emulsion | |
| | Demineralized water | 150.3 |
| | Sodium lauryl sulfate | 6.44 |
| | n-Butyl acrylate | 227.9 |
| | Styrene | 148.1 |
| | Methacrylic acid | 4.0 |
| | Allyl methacrylate | 20.0 |
| F | Second stage pre emulsion | |
| | Demineralized water | 150.3 |
| | Sodium lauryl sulfate | 6.44 |
| | n-Butyl acrylate | 156.3 |
| | Styrene | 43.7 |
| | Methacrylic acid | 200.0 |
| | n-Octyl mercaptane | 1.48 |
| G | Oxidant first and second stage | |
| | Ammonium persulfate | 1.14 |
| | Demineralized water | 84.4 |
| H | Reducing agent first and second stage | |
| | Sodium bisulfite | 1.14 |
| | Demineralized water | 84.4 |
| I | Oxidant chaser | |
| | t-Butyl hydroperoxide | 0.86 |
| | Demineralized water | 2.2 |
| J | Reducing agent chaser | |
| | Sodium formaldehyde sulfoxylate | 0.40 |
| | Demineralized water | 2.2 |

Demineralized water and sodium lauryl sulfate (A) are charged to a jacketed 3 l glass reactor and purged with nitrogen (5 l/h). The contents of the reactor are heated to 60-63° C. and the aqueous solution of iron (II) heptahydrate (B) is added to the reactor. After a hold period of 5 minutes 4% of monomer pre-emulsion E is added to the reactor. Subsequently solutions C and D are added.

The remainder of monomer pre-emulsion E and 45% of solutions G and H are dosed into the reactor simultaneously over a period of 90 minutes. After 10 minutes the addition the second stage pre-emulsion F is started. F is dosed into the reactor over a period of 90 minutes. Simultaneously the addition of the remainder of solutions G and H is started. These solutions are dosed over a period of 110 minutes. After the additions have been finalized, the batch is cooled to 55° C. Peroxide solution I is added to the reactor. Five minutes after adding I reducer solution J is added over a period of 20 minutes. After completion of the addition, the contents of the reactor are kept at 55° C. for 20 minutes.

The solids content of the dispersion (drying for 1 hour at 125° C.) was found to be 35.6%. The pH was 2.4. The particle size of the dispersion was 116 nm. The acid value of the polymer was 166 mg KOH/g.

Comparative Experiment 2b

According to U.S. Pat. No. 5,306,744—Modification of a Carboxyl Functional Polymer Dispersion with an Ethylenically Unsaturated Monoepoxide

| | | |
|---|---|---|
| A | Polymer dispersion from Comparative experiment 2a | 200 |
| B | Tetrabutyl ammoniumhydroxide 40% | 11.2 |
| | Demineralized water | 37.5 |
| C | Glycidylmethacrylaat | 24.7 |
| | 2,6-ditert.butyl-4-methylphenol | 0.05 |

200 Grams of the polymer dispersion of Comparative experiment 2a are charged into a 3 liter jacketed reactor and purge with air (5 l/h). The contents of the reactor are heated to 80° C. Solution B is added to the contents of the reactor over a period of 5 to 10 minutes. Mixture C is than added in about 10 minutes. The reaction mixture is kept at 80° C. for 4 hours. The contents are cooled to 30° C. and filtered through a 60µ filter-bag. After the modification a highly viscous polymer dispersion was obtained. The dispersion had a solid content (drying for 1 Hour at 125° C.) of 33.8% and the pH was 6.6. The particle size was found to be 480 nm. The acid value of the polymer was 78.1 mg KOH/g.

When a film was cast from this dispersion it had as dull and gritty appearance.

Examples 3 to 10

A number of dispersions were made according to the method outlined in example 1A. The raw material compositions of the dispersions are given in table 1.

TABLE 1

| | Example | 3 | 4 | 5 | 6 |
|---|---|---|---|---|---|
| A Precharge | Sodium dodecyl sulfate | 5.15 | 5.15 | 5.15 | 5.15 |
| | Demineralized water | 878.8 | 978.8 | 978.8 | 978.8 |
| B Initiator seed | Demineralized water | 25 | 25 | 25 | 25 |
| | Ammonium persulfate | 1 | 1 | 1 | 1 |

TABLE 1-continued

| Example | | | 3 | 4 | 5 | 6 |
|---|---|---|---|---|---|---|
| C | First stage monomer mixture | n-butyl acrylate | 165.1 | 195.4 | 206.4 | 244.2 |
| | | Styrene | 168.3 | 54.6 | 210.4 | 68.3 |
| | | Methacrylic acid | 166.6 | 250 | 208.4 | 312.5 |
| | | n-octyl mercaptane | 5.6 | 11.2 | 14 | 7 |
| | | Mercapto ethanol | 2.8 | 5.6 | 7 | 3.5 |
| D | Initiator first stage | Demineralized water | 266.7 | 166.7 | 166.7 | 166.7 |
| | | Sodium dodecyl sulfate | 9.85 | 9.85 | 9.85 | 9.85 |
| | | Ammonium persulfate | 1.87 | 1.87 | 1.87 | 1.87 |
| E | Neutralization first stage | Demineralized water | 154.9 | 154.9 | 154.9 | 154.9 |
| | | Ammonia (25%) | 27.3 | 40.5 | 33.7 | 50.6 |
| F | Second stage monomer mixture | n-butyl acrylate | 427.4 | 427.4 | 356.1 | 356.1 |
| | | Styrene | 277.6 | 277.6 | 231.4 | 231.4 |
| | | Methacrylic acid | 7.42 | 7.42 | 6.25 | 6.25 |
| | | Allyl methacrylate | 37.5 | 37.5 | 31.25 | 31.25 |
| G | Oxidant second stage I | Tertiary-butyl hydroperoxide | 2.5 | 2.5 | 2.5 | 2.5 |
| | | Demineralized water | 25 | 25 | 25 | 25 |
| H | Catalyst second stage I | Iron (II) sulfate heptahydrate | 0.033 | 0.033 | 0.033 | 0.033 |
| | | EDTA, disodium, dihydrate | 0.042 | 0.042 | 0.042 | 0.042 |
| | | Demineralized water | 25 | 25 | 25 | 25 |
| I | Reducing agent second stage I | D-Isoascorbic acid | 3.5 | 3.5 | 3.5 | 3.5 |
| | | Demineralized water | 275 | 275 | 275 | 275 |
| J | Oxidant second stage II | Tertiary-butyl hydroperoxide | 2.5 | 2.5 | 2.5 | 2.5 |
| | | Demineralized water | 25 | 25 | 25 | 25 |

The dispersions obtained were then modified with glycidyl methacrylate as described in example 1 B. The raw material compositions are given in table 2, properties of the modified dispersion in table 2.

TABLE 2

| Example | 7 | 8 | 9 | 10 |
|---|---|---|---|---|
| Dispersion from example 3 | 554 | — | — | — |
| Dispersion from example 4 | — | 518.1 | — | — |
| Dispersion from example 5 | — | — | 514.1 | — |
| dispersion from example 6 | — | — | — | 492.6 |
| tera-butyl ammonium hydroxide (40% aqueous) | 3 | 5.4 | 4.4 | 7 |
| Demineralized water | 0 | 41.9 | 29.3 | 90 |
| glycidyl methacrylate | 21.3 | 43.6 | 31.9 | 59.8 |
| 2,6-ditert.butyl-4methylphenol | 0.042 | 0.087 | 0.064 | 0.12 |

TABLE 3

| | Properties | | | |
|---|---|---|---|---|
| example | 7 | 8 | 9 | 10 |
| Acid number first polymer (mg KOH/g) | 217 | 326 | 217 | 326 |
| Ratio second stage polymer to first stage polymer | 1.5 | 1.5 | 1 | 1 |
| solids content | 38.1 | 39.6 | 40.9 | 40.4 |
| PH | 6.5 | 6.4 | 6.8 | 6.6 |
| particle size | 73 | 293 | 111 | 297 |

From table 3 it becomes clear that high solid contents can be achieved as well as a low particle size and that the particle size can be controlled to a large extend by the acid number of the first stage polymer and the ratio between the second and the first stage polymer.

Examples 11 to 15

Paint Evaluation

Clear varnishes were formulated with the UV-curing dispersions prepared above.

The coatings were applied by a EC-200 EZ Coater wire-coater, (ex Ichemco) dry film thickness 50 micron, on a sheet of PVC-flooring and on a galvanized steel panel and dried at ambient temperature for 20 minutes. The Konig hardness of the tack-free coatings was determined in accordance with DIN 53 157 at 23° C. and a relative humidity of 50%. The coatings were then UV cured at 15 m/min under a Hg and Ga lamp. The hardness after UV curing was determined and the increase in hardness was calculated. Also the appearance of the coating was visually checked.

| Example | 11 | 12 | 13 | 14 | 15 |
|---|---|---|---|---|---|
| dispersion from example 1 | 30 | — | — | — | — |
| dispersion from comp. Example 2 | — | 30 | — | — | — |
| dispersion from example 7 | — | — | 30 | — | — |
| dispersion from example 9 | — | — | — | 30 | — |
| dispersion from example 10 | — | — | — | — | 30 |
| BYK 028 | 0.2 | 0.2 | 0.2 | 0.2 | 0.2 |
| BYK 346 | 0.1 | 0.1 | 0.1 | 0.1 | 0.1 |
| IRGACURE 500 | 0.3 | 0.3 | 0.3 | 0.3 | 0.3 |
| appearance | OK | NOK | OK | OK | OK |
| Konig hardness before UV-curing (s) | 87 | 102 | 51 | 74 | 88 |
| Konig hardness after UV-curing (s) | 125 | 116 | 94 | 108 | 116 |
| Hardness increase | 38 | 14 | 43 | 34 | 28 |

From these results it becomes clear that all binders according to this invention have good appearance and superior hardness increase after UV-curing compared to the comparative example according to the state-of-the-art.

The invention claimed is:

1. Process for the manufacture of a waterborne curable multistage polymer dispersion comprising the steps of;
   a. making an aqueous emulsion or solution of a first stage polymer comprising carboxylic acid functionalised monomers to an amount sufficient to make the first stage polymer water soluble or dispersible,
   b. at least partially neutralising the first stage polymer with a base,
   c. forming a two-stage polymer dispersion by adding to the at least partially neutralised first stage polymer a second stage monomer mixture and emulsion polymerising said second stage monomer mixture to a second stage polymer which is less hydrophilic than the first stage polymer,
   d. reacting with the obtained two-stage polymer dispersion a bi-functional compound comprising an ethylenically unsaturated group and a group reactive towards the carboxylic acid in the two-stage polymer.

2. A process according to claim 1, wherein the first stage polymer comprises 10-70 wt % of carboxylic acid functionalised monomers and the second stage polymer comprises less than 10 wt % of carboxylic acid functionalised monomer.

3. A process according to claim 1, wherein the emulsion or solution of the first stage polymer is prepared by aqueous emulsion polymerisation of a first monomer mixture comprising carboxylic acid functionalised monomers.

4. A process according to claim 3, wherein the amount of carboxylic acid functionalised monomer in the first monomer mixture is chosen in combination with other monomers present in the first monomer mixture such that the resulting first stage polymer is soluble in water.

5. A process according to any one of claim 3 or 4, wherein the first monomer mixture also comprises a chain transfer agent.

6. A process according to claim 5, wherein the chain transfer agent is an addition fragmentation chain transfer agent.

7. A process according to claim 1, wherein the number average molecular weight of the first stage polymer is between 500 and 100,000.

8. A process according to claim 1, wherein the carboxylic acid functionalised monomer is a (meth) acrylic acid and the first stage polymer further comprises (meth)acrylic acid esters.

9. A process according to claim 1, wherein the degree of neutralisation (defined as the ratio of carboxylic salt groups to the initial concentration of carboxylic acid groups) of the first stage polymer in step (b) is between 0.2 and 0.8.

10. A process according to claim 1, wherein the base is a volatile base.

11. A process according to claim 1, wherein at least 50% of the first stage polymer is attached to the second stage polymer.

12. A process according to claim 1, wherein the second stage monomer mixture contains a polyfunctional monomer to impart a gel content to the second stage polymer.

13. A process according to claim 12, wherein the polyfunctional monomer comprises at least 2 ethylenically unsaturated groups.

14. A process according to claim 1, wherein the bi-functional compound is an ethylenically unsaturated mono-epoxide.

15. A process according to claim 1, wherein after preparation step (d) a secondary crosslinking agent is added to the dispersion that is reactive to functional groups other than the ethylenically unsaturated compounds used in step (d).

16. A process according to claim 15, wherein the secondary crosslinking agent is chosen from the group of compounds comprising a hydrazide function, alkylated amino aldehydes, poly-isocyanate or blocked poly-isocyanate.

17. A process for the manufacture of curable polymer powder, wherein the reaction product of the process according to claim 1 is isolated from the aqueous polymer dispersion.

18. A waterborne curable multistage polymer dispersion or powder obtained by the process comprising;
   a. making an aqueous emulsion or solution of a first stage polymer comprising carboxylic acid functionalised monomers to an amount sufficient to make the first stage polymer water soluble or dispersible,
   b. at least partially neutralising the first stage polymer with a base,
   c. forming a two-stage polymer dispersion by adding to the at least partially neutralised first stage polymer a second stage monomer mixture and emulsion polymerising said second stage monomer mixture to a second stage polymer which is less hydrophilic than the first stage polymer,
   d. reacting with the obtained two-stage polymer dispersion a bi-functional compound comprising an ethylenically unsaturated group and a group reactive towards the carboxylic acid in the two-stage polymer.

19. The waterborne curable multistage polymer dispersion according to claim 18, wherein the first stage polymer has a molecular weight between 500 to 100,000 g/mole.

20. A polymer dispersion according to claim 19, wherein the first stage polymer comprises 10 to 70 wt. % of carboxylic acid functionalised monomers and the second stage polymer comprises less than 10 wt. % of carboxylic acid functionalised monomers.

21. The polymer dispersion according to claim 18, having a solids content of at least 35 wt % and an average particle size of less than 400 nanometers.

22. The polymer dispersion according to claim 18, wherein the degree of attachment of the first stage polymer on the second stage polymer is at least 40%.

23. The polymer dispersion according to claim 18, further comprising cure promoting catalysts selected from the group of organo-metallics, metal dryer salts, preferably cobalt salts, for auto-oxidation curing or thermal initiators, for heat curing.

24. Coating composition comprising a waterborne polymer dispersion according to claim 18, further comprising one or more additives chosen from the group of dispersants, lubricants, anti-foaming agents, solvents, film formation aids, plasticizers, antifreeze agents, waxes, preservatives, thickeners, pigments.

25. A process for the coating of an article comprising the steps of;
   applying a film of a polymer dispersion according to claim 18 on the surface of the article,
   curing the curable multistage polymer, after evaporating at least part of the water, by reacting the ethylenically unsaturated groups
   optionally promoting the curing by raising the temperature.

26. A process according to claim 25, wherein the ethylenically unsaturated groups are reacted by one or more of the treatments chosen from UV curing, electron beam curing, thermal initiator curing or auto-oxidation curing.

27. A process according to claim 25, wherein the Konig hardness increase of the coating film on curing is at least 20%.

28. Coated articles comprising a substrate at least partly coated with a polymer dispersion according to claim 18.

29. The polymer dispersion according to claim 23, wherein the thermal initiators comprise azo compounds.

30. The polymer dispersion according to claim 18, wherein the emulsion or solution of the first stage polymer is prepared by aqueous emulsion polymerisation of a first monomer mixture comprising carboxylic acid functionalised monomers.

31. The polymer dispersion according to claim 18, wherein the amount of carboxylic acid functionalised monomer in the first monomer mixture is chosen in combination with other monomers present in the first monomer mixture such that the resulting first stage polymer is soluble in water.

32. The polymer dispersion according to claim 18, wherein the first monomer mixture also comprises a chain transfer agent.

33. The polymer dispersion according to claim 32, wherein the chain transfer agent is an addition fragmentation chain transfer agent.

34. The polymer dispersion according to claim 18, wherein the carboxylic acid functionalised monomer is a (meth) acrylic acid and the first stage polymer further comprises (meth) acrylic acid esters.

35. The polymer dispersion according to claim 18, wherein the degree of neutralisation (defined as the ratio of carboxylic salt groups to the initial concentration of carboxylic acid groups) of the first stage polymer in step (b) is between 0.2 and 0.8.

36. The polymer dispersion according to claim 18, wherein the base is a volatile base.

37. The polymer dispersion according to claim 18, wherein the second stage monomer mixture contains a polyfunctional monomer to impart a gel content to the second stage polymer.

38. The polymer dispersion according to claim 37, wherein the polyfunctional monomer comprises at least 2 ethylenically unsaturated groups.

39. The polymer dispersion according to claim 38, wherein the bi-functional compound is an ethylenically unsaturated mono-epoxide.

40. The polymer dispersion according to claim 18, wherein after preparation step (d) a secondary crosslinking agent is added to the dispersion that is reactive to functional groups other than the ethylenically unsaturated compounds used in step (d).

41. The polymer dispersion according to claim 18, wherein the secondary crosslinking agent is chosen from the group of compounds comprising a hydrazide function, alkylated amino aldehydes, poly-isocyanate or blocked poly-isocyanate.

* * * * *